(12) United States Patent
Kovvuri et al.

(10) Patent No.: US 12,307,401 B1
(45) Date of Patent: May 20, 2025

(54) SYSTEMS AND METHODS OF ACHIEVING FASTER OPTIMALITY THROUGH PRIMING OF SOLUTION SPACE FOR MEAT PROCESSING INDUSTRY

(71) Applicant: Blue Yonder Group, Inc., Scottsdale, AZ (US)

(72) Inventors: Raja Sekhar Kovvuri, Bangalore (IN); Vikash Kumar Jalan, West Bengal (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 250 days.

(21) Appl. No.: 17/538,453

(22) Filed: Nov. 30, 2021

Related U.S. Application Data

(60) Provisional application No. 63/122,571, filed on Dec. 8, 2020.

(51) Int. Cl.
*G06Q 10/00* (2023.01)
*G06Q 10/0633* (2023.01)
*G06Q 10/083* (2023.01)

(52) U.S. Cl.
CPC ....... *G06Q 10/0633* (2013.01); *G06Q 10/083* (2013.01)

(58) Field of Classification Search
CPC .......................................... G06Q 10/00–50/00
USPC .......................................................... 705/7.27
See application file for complete search history.

(56) References Cited

U.S. PATENT DOCUMENTS

| | | | |
|---|---|---|---|
| 2010/0114667 A1* | 5/2010 | Singh | G06Q 10/063 705/7.11 |
| 2016/0155164 A1* | 6/2016 | Ott | G06Q 10/087 705/26.35 |
| 2020/0126167 A1* | 4/2020 | Meerkov | G06Q 10/06393 |
| 2021/0148891 A1* | 5/2021 | Beal | G01N 33/497 |
| 2022/0172139 A1* | 6/2022 | Brooks | G05B 19/4065 |

\* cited by examiner

*Primary Examiner* — Mustafa Iqbal
(74) *Attorney, Agent, or Firm* — Spencer Fane LLP; Steven J. Laureanti

(57) ABSTRACT

A system and method for a supply chain system comprising one or more supply chain entities. Embodiments include accessing an initial supply chain plan of the one or more supply chain entities, performing an empirical analysis to determine a quantity of uniform time buckets required to cover the entire planning horizon of the initial supply chain plan, determining a quantity of time buckets to remove from the quantity of uniform time buckets while maintaining the same planning horizon, aggregate bucketized capacities, and response buffers as the initial supply chain plan, removing the determined quantity of time buckets from the quantity of uniform time buckets, identifying initial supply chain plan response buffers and non-responsive buffers, and generating a reduced scope supply chain problem by deactivating one or more non-responsive buffers.

20 Claims, 13 Drawing Sheets

SYSTEMS AND METHODS OF ACHIEVING FASTER OPTIMALITY THROUGH PRIMING OF SOLUTION SPACE FOR MEAT PROCESSING INDUSTRY

CROSS REFERENCE TO RELATED APPLICATIONS

The present disclosure is related to that disclosed in the U.S. Provisional Application No. 63/122,571, filed Dec. 8, 2020, entitled "Achieving Faster Optimality Through Priming of Solution Space for Meat Processing Industry." U.S. Provisional Application No. 63/122,571 is assigned to the assignee of the present application. The present invention hereby claims priority under 35 U.S.C. § 119(e) to U.S. Provisional Application No. 63/122,571.

TECHNICAL FIELD

The present disclosure relates generally to systems and methods of generating supply chain plans and, more specifically to, solving supply chains by reducing the complexity of supply chain plans in large-dataset, high-granularity scenarios without compromising plan accuracy and quality.

BACKGROUND

Supply chain plans may specify actions and coordinate activities for various supply chain entities operating in a supply chain system, including but not limited to suppliers, manufacturers, distribution centers, and retailers. Supply chain plans may be generated as solutions to one or more supply chain problems, which may direct purchasing, selling, manufacturing, shipping, and other actions for each supply chain entity in the supply chain system. Linear programming and optimization (LPOPT) techniques may enable supply chain entities to solve supply chain problems, generate supply chain plans in response to supply chain problems, and evaluate hypothetical what-if supply and demand scenarios. However, as supply chain plans grow in size and complexity and increasingly incorporate large datasets and high granularity (in which the supply chain plan must specify actions for supply chain entities across a large number of time periods or "time buckets"), the time and computational resources required to generate supply chain plans using LPOPT increase rapidly. Such complex and granular supply chain plans may be required in, for example, the meat processing industry, in which finished goods often draw supplies from many buffers, and initial supplies may be used to fulfill many final objectives. Solutions that reduce supply chain plan complexity in order to reduce the time and computational resources required to generate such supply chain plans lead also to the reduction of plan accuracy and quality, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
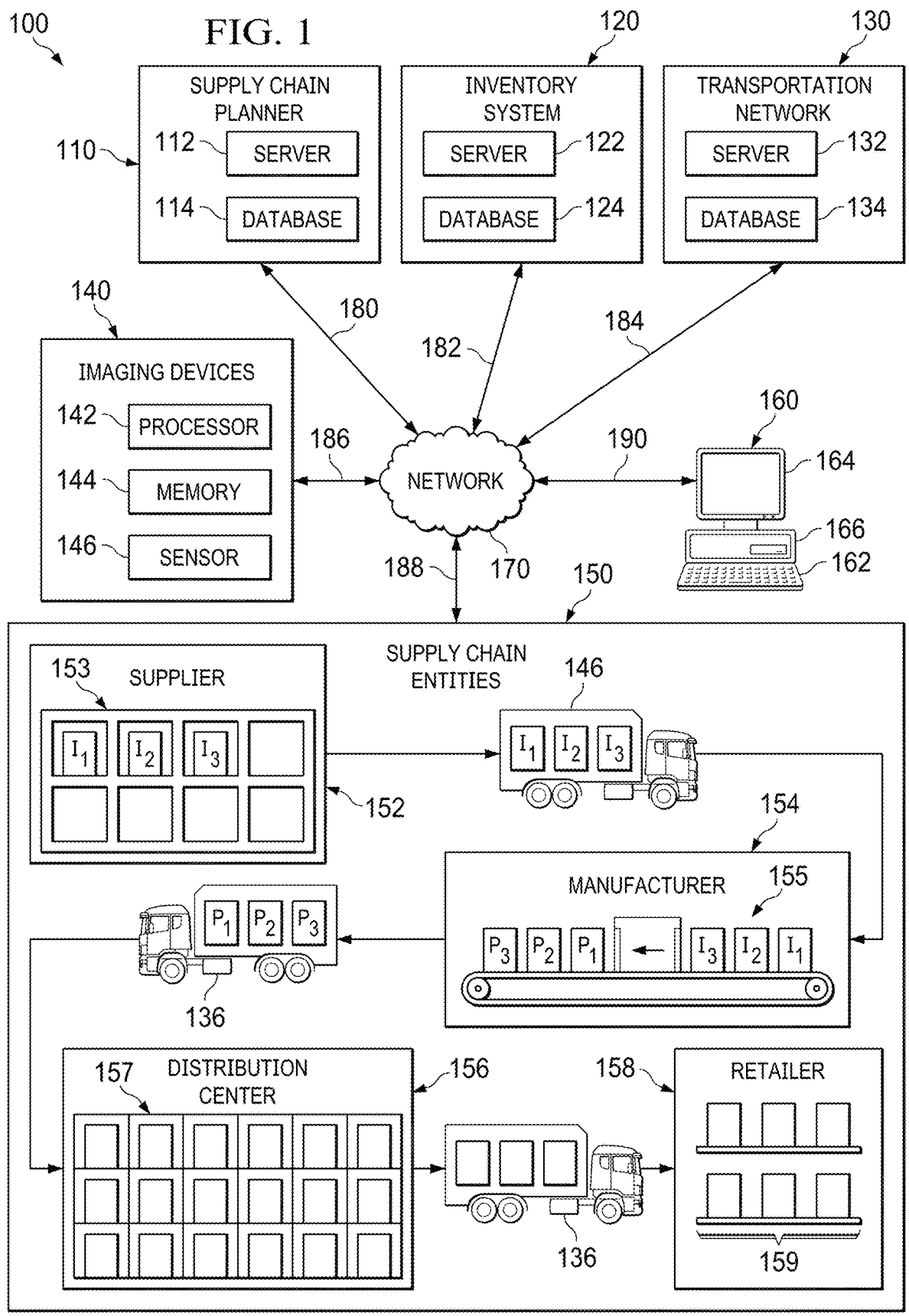
FIG. 1 illustrates an exemplary supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide supply chain planning systems and methods that utilize solution space priming and elimination of non-responsive supply chain buffers to generate supply chain plans for complex bills of material (BOM) scenarios with increased efficiency and no significant plan optimality degradation.

FIG. 1 illustrates exemplary supply chain network 100 according to a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, inventory system 120, transportation network 130, one or more imaging devices 140, one or more supply chain entities 150, a single computer 160, and a single network 170 are shown and described, embodiments contemplate any number of supply chain planners, inventory systems, transportation systems, imaging devices, supply chain entities, computers, or networks, according to particular needs.

In one embodiment, supply chain planner 110 comprises server 112 and database 114. As described in more detail below, supply chain planner 110 comprises one or more modules to, for example, utilize solution space priming to generate reduced scope supply chain plans for complex BOM scenarios. Embodiments of supply chain planner 110 access an initial supply chain plan comprising several granular time buckets spread out over multiple time periods (such as, for example, time buckets comprising days, weeks, and months), reduce the number of time buckets present in the initial supply chain plan, and generate a corresponding reduced time bucket supply chain problem. Embodiments further enable supply chain planners to generate supply chain plans quickly and efficiently in highly complex, granular supply chains, in which many BOMs may be exploded or imploded to yield alternate outputs, without significantly adversely impacting the quality of the generated supply chain plans and while minimizing reductions in supply chain plan accuracy.

Inventory system 120 comprises server 122 and database 124. Server 122 of inventory system 120 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, inventory database 124 includes current or projected inventory quantities or states, order rules, or explanatory variables. For example, inventory database 124 may comprise the current level of inventory for each item at one or more stocking points across supply chain network 100. In addition, inventory database 124 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 124 may comprise explanatory variables that describe the data relating to specific past, current, or future indicators and the data of promotions, seasonality, special events (such as sporting events), weather, and the like. According to some embodiments, supply chain planner 110 accesses and stores inventory data in inventory database 124, which may be used by supply chain planner 110 to generate one or more supply chain plans. In addition, or as an alternative, the inventory data of inventory database 124 may be updated by receiving current item quantities, mappings, or locations from inventory system 120, transportation network 130, one or more imaging devices 140, and/or one or more supply chain entities 150.

Transportation network 130 comprises server 132 and database 134. According to embodiments, transportation network 130 directs one or more transportation vehicles 136 to ship one or more items between one or more supply chain entities 150, based, at least in part, on the supply chain plans and/or instruction sets generated by supply chain planner 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with supply chain planner 110, inventory system 120, transportation network 130, one or more imaging devices 140, and/or one or more supply chain entities 150 to identify the location of the transportation vehicle and the location of any inventory or shipment located on the transportation vehicle. The number of items shipped by transportation vehicles 136 in transportation network 130 may also be based, at least in part, on the number of items currently in stock at one or more supply chain entities 150, the number of items currently in transit in transportation network 130, a forecasted demand, a supply chain disruption, and the like.

One or more imaging devices 140 comprise one or more processors 142, memory 144, and one or more sensors 146, and may include any suitable input device, output device, fixed or removable computer-readable storage media, or the like. According to embodiments, one or more imaging devices 140 comprise an electronic device that receives imaging data from one or more sensors 146 or from one or more data storage locations in supply chain network 100. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases. One or more sensors 146 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation network 130, one or more imaging devices 140, one or more supply chain entities 150, computer 160, and/or network 170 using one or more communication links 180-190.

In addition, or as an alternative, the one or more sensors may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or the like. One or more imaging devices 140 may generate a mapping of one or more items in supply chain network 100 by scanning an identifier or object associated with an item and identifying the item based, at least in part, on the scan. This may include, for example, a stationary scanner located at one or more supply chain entities 150 that scans items as the items pass near the scanner. Supply chain planner 110, inventory system 120, transportation network 130, and one or more imaging devices 140 may use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by a solving engine of supply chain planner 110. Plans may comprise one or more of a master supply chain plan, production plan, demand plan, distribution plan, and the like.

As shown in FIG. 1, supply chain network 100 operates on one or more computers 160 that are integral to or separate from the hardware and/or software that support supply chain planner 110, inventory system 120, transportation network 130, one or more imaging devices 140, and one or more supply chain entities 150. Supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. One or more computers 160 may include any suitable input device 162, such as a keypad, mouse, touch screen, microphone, or other device to input information. One or more computers 160 may also include any suitable output device 164, such as, for example, a computer monitor, that may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein.

In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150.

These one or more users may include, for example, a "manager" or a "planner" handling generation of supply chain plans and instruction sets, managing the inventory of items, imaging items, managing storage and shipment of items, and/or one or more related tasks within supply chain network 100. In addition, or as an alternative, these one or more users within supply chain network 100 may include, for example, one or more computers 160 programmed to autonomously handle, among other things, shelving resets, task management, communication and assignment of instructions, issue identification and resolution, controlling manufacturing equipment, and adjusting various levels of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers. Suppliers 152 may comprise automated distribution systems 153 that automatically transport products to one or more manufacturers based, at least in part, on supply chain plans and/or instruction sets determined by supply chain planner 110 and/or one or more other factors described herein.

Manufacturers 152 may be any suitable entity that manufactures at least one product. Manufacturers 152 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers, an item that needs further processing, or any other item. Manufacturers 152 may, for example, produce and sell a product to suppliers 152, other manufacturers 152, distribution centers 156, retailers 158, a customer, or any other suitable person or entity. Manufacturers 152 may comprise automated robotic production machinery 155 that produce products based, at least in part, on supply chain plans and/or instruction sets determined by supply chain planner 110 and/or one or more other factors described herein.

Distribution centers 156 may be any suitable entity that offers to store or otherwise distribute at least one product to one or more retailers and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more supply chain plans generated by supply chain planner 110.

Retailers 158 may be any suitable entity that obtains one or more products to sell to one or more customers. Retailers 158 may (like other one or more supply chain entities 150) comprise a corporate structure having a retail headquarters and one or more retail stores. Retail headquarters comprises a central planning office with oversight of one or more retail stores. Retailer stores may comprise any online or brick-and-mortar store, including stores with shelving systems. The one or more retail stores may sell products according to rules, strategies, orders, and/or guidelines developed by one or more retail headquarters. For example, retail headquarters may create supply chain plans that determine how the store will shelve or display one or more products. Although supply chain plan execution may be performed in part by one or more retail employees, embodiments contemplate automated configuration of shelving and retail displays. This may include, for example, automated robotic shelving machinery 159 that places products on shelves or automated shelving that automatically adjusts based, at least in part, on the supply chain plans. The shelving systems may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 150 are shown and described as separate and distinct entities, the same entity may simultaneously act as any one of the one or more supply chain entities 150. For example, one or more supply chain entities 150 acting as a manufacturer 154 can produce a product, and the same one or more supply chain entities 150 can act as a supplier 152 to supply an item to itself or another one or more supply chain entities 150. Although one example of supply chain network 100 is shown and described in FIG. 1, embodiments contemplate any configuration of supply chain network 100, without departing from the scope described herein.

In one embodiment, each of supply chain planner 110, inventory system 120, transportation network 130, one or more imaging devices 140, supply chain entities 150 and computer 160 may be coupled with network 170 using communications link 180-190, which may be any wireline, wireless, or other link suitable to support data communications between supply chain planner 110 and network 170 during operation of supply chain network 100. Although communication links 180-190 are shown as generally coupling supply chain planner 110, inventory system 120, transportation network 130, one or more imaging devices 140, one or more supply chain entities 150, and computer 160 to network 170, any of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained locally to, or externally of supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate supply chain plans and/or instruction sets for the inventory of one or more supply chain entities 150 in supply chain network 100. Furthermore, supply chain planner 110, inventory system 120, transportation network 130 and/or one or more imaging devices 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, the configuration and quantity of packaging and shipping of products, and the display of products at one or more retail locations based on one or more supply chain plans and instruction sets, generated plans and policies and/or current inventory or production levels. When the inventory of an item falls to a reorder point, supply chain planner 110 may then automatically adjust product mix ratios, inventory levels, production of products of manufacturing equipment, and proportional or alternative sourcing of one or more supply chain entities 150 until the inventory is resupplied to a target quantity.

For example, the methods described herein may include computers receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers looking up the received product data in a database system associated with supply chain planner 110, inventory system 120, and/or transportation network 130 to identify the item corresponding to the product data received from the automated machinery.

Computers 160 may also receive, from the automated machinery, a current location of the identified item. Based on the identification of the item, computers 160 may also identify (or alternatively generate) a first mapping in the database system, where the first mapping is associated with the current location of the item. Computer 160 may also identify a second mapping in the database system, where the second mapping is associated with a past location of the identified item. Computer 160 may also compare the first mapping and the second mapping to determine if the current location of the identified item in the first mapping is different than the past location of the identified item in the second mapping. Computer 160 may then send instructions to the automated machinery based, as least in part, on one or more differences between the first mapping and the second mapping such as, for example, to locate an item to add to or remove from a shelf or an inventory of or shipment for one or more supply chain entities 150. In addition, or as an alternative, supply chain planner 110 monitors the supply chain constraints of one or more items at one or more supply chain entities 150 and adjusts the orders and/or inventory of the one or more supply chain entities 150 based on the supply chain constraints.

Figure 2:
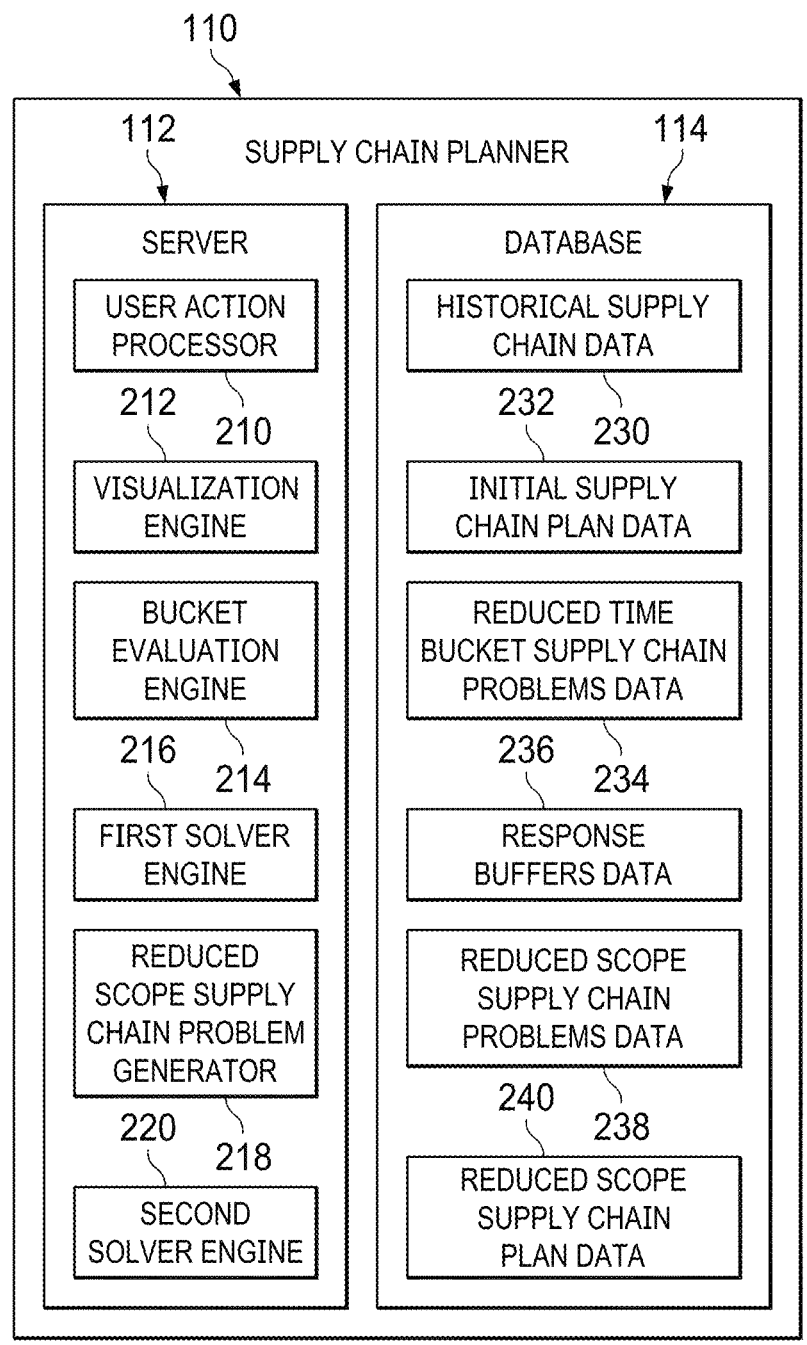
FIG. 2 illustrates the supply chain planner of FIG. 1 in greater detail, according to an embodiment.

FIG. 2 illustrates supply chain planner 110 of FIG. 1 in greater detail according to an embodiment. As discussed above, supply chain planner 110 may comprise one or more computers at one or more locations including associated input devices, output devices, non-transitory computer-readable storage media, processors, memory, or other components for receiving, processing, storing, and communicating information according to the operation of supply chain network 100. Additionally, supply chain planner 110 comprises server 112 and database 114. Although supply chain planner 110 is shown as comprising a single server 112 and a single database 114, embodiments contemplate any suitable number of computers, servers 112, or databases 114 internal to or externally coupled with supply chain planner 110. According to some embodiments, supply chain planner 110 may be located internal to one or more retailers 158 of one or more supply chain entities 150. In other embodiments, supply chain planner 110 may be located external to one or more retailers 158 of one or more supply chain entities 150 and may be located in for example, a corporate retailer of the one or more retailers, according to particular needs.

Server 112 of supply chain planner 110 may comprise user action processor 210, visualization engine 212, bucket evaluation engine 214, first solver engine 216, reduced scope supply chain problem generator 218, and second solver engine 220. Although server 112 is illustrated and described as comprising a single user action processor 210, visualization engine 212, bucket evaluation engine 214, first solver engine 216, reduced scope supply chain problem generator 218, and second solver engine 220, embodiments contemplate any suitable number or combination of these located at one or more locations, local to, or remote from supply chain planner 110, such as on multiple servers or computers at any location in supply chain network 100.

According to embodiments, user action processor 210 receives and processes a user input, such as, for example, input received by input device 162 of one or more computers 160. One or more computers 160 may transmit input to supply chain planner 110 using one or more communication links 180-190. User action processor 210 may register the input from one or more computers 160 and transmit the input to visualization engine 212 and/or bucket evaluation engine 214, first solver engine, reduced scope supply chain problem generator, and second solver engine.

Visualization engine 212 generates one or more graphical user interface displays. According to embodiments, visualization engine 212 may access database 114, including but not limited to historical supply chain data 230, initial supply chain plan data 232, reduced time bucket supply chain problems data 234, response buffers data 236, reduced scope supply chain problems data 238, and reduced scope supply chain plan data 240, and may generate one or more graphical user interface displays. The one or more graphical user interface displays may convey information, including supply chain plan data, sales data, buffers data, supply chain entity data, and/or any other type of information about supply chain network 100 and the ongoing sales of products sold throughout supply chain network 100. In an embodiment, visualization engine 212 may process input transmitted by user action processor 210, and, in response to the input, may generate one or more graphical user input displays that allow one or more computers to interact with the one or more graphical user interface displays and to review different information displayed by visualization engine 212, as illustrated in greater detail below.

According to embodiments, a "Bucket Evaluation for Priming the Solution Space in First Solve" is an empirical analysis that needs to be conducted in the initial phase of solving the supply chain problem. There is a need to determine the least number of time buckets for the same plan horizon. For a given supply chain planning instance the ratio of minimum number reduced uniform buckets spanning the entire planning horizon to the original buckets spanning the same planning horizon which determine the response buffers (item@location) tends to be the same across any number of runs. In order to generate one or more reduced time bucket supply chain problems without significantly impairing the quality and accuracy of the initial supply chain plan, and as described below in relation to the method, bucket evaluation engine 214 may analyze the initial supply chain plan to determine the number of time buckets that may be reduced without significantly impacting the quality of the initial supply chain plan. Having determined the number of uniform time buckets by which the initial supply chain plan may be reduced, the same information can be used for the "First Solve in Priming the Solution Space of the Supply Chain Linear Programming and Optimization" problem.

First solver engine 216 may access the reduced time bucket supply chain problem stored in reduced time bucket supply chain problems data 234. First solver engine 216 may solve the reduced time bucket supply chain problem in order to locate actual response buffers that contribute to the outcome of solving the reduced time bucket supply chain problem, and non-responsive buffers that do not significantly influence the outcome of solving the reduced time bucket supply chain problem. Having located response buffers, first solver engine 216 stores the response buffers in response buffers data 236.

Reduced scope supply chain problem generator 218 may access initial supply chain plan data 232 and response buffers data 236. Reduced scope supply chain problem generator 218 may generate a reduced scope supply chain problem based on initial supply chain plan data 232 and response buffers data 236. In an embodiment, the reduced scope supply chain problem may comprise a supply chain problem that comprises identical time buckets and capacities as compared to the initial supply chain plan, but with the scope reduced and the non-responsive buffers removed to decrease the time and computational resources necessary to solve the reduced scope supply chain problem without significantly affecting the quality of the resulting reduced scope supply chain plan. Reduced scope supply chain problem generator 218 may store the reduced scope supply chain problem in reduced scope supply chain problems data 238.

Second solver engine 220 may access reduced scope supply chain problems data 238. Second solver engine 220 may solve the reduced scope supply chain problem to generate the supply chain plan.

Database 114 of supply chain planner 110 may comprise one or more databases or other data storage arrangements at one or more locations, local to, or remote from, server 112. Database 114 may comprise, for example, historical supply chain data 230, initial supply chain plan data 232, reduced time bucket supply chain problems data 234, response buffers data 236, reduced scope supply chain problems data 238, and reduced scope supply chain plan data 240. Although database 114 is shown and described as comprising historical supply chain data 230, initial supply chain plan data 232, reduced time bucket supply chain problems data 234, response buffers data 236, reduced scope supply chain problems data 238, and reduced scope supply chain plan data 240, embodiments contemplate any suitable number or combination of these, located at one or more locations, local to, or remote from, supply chain planner 110 according to particular needs.

Historical supply chain data 230 comprises may comprise, for example, any data relating to the supply chain system. Historical supply chain data 230 may comprise data relating to supply chain entities 150, previous supply chain plans, transactions and shipments between supply chain entities 150, or past sales, past demand, purchase data, promotions, events, or the like of one or more products and/or one or more supply chain entities 150. Historical data may be stored at time intervals such as, for example, by the minute, hour, daily, weekly, monthly, quarterly, yearly, or any suitable time interval, including substantially in real time.

Initial supply chain plan data 232 may comprise data related to one or more initial supply chain plans. In an embodiment, one or more initial supply chain plans may comprise the generated solutions to one or more initial supply chain problems that retain full supply chain problem complexity (including but not limited to all original time buckets, all aligned capacities, all buffers, and full comprehensive supply chain scope), and which may require significant time and computational resources to solve.

Reduced time bucket supply chain problems data 234 may comprise one or more reduced time buckets supply chain problems. In an embodiment, and as compared to the number of time buckets present in the initial supply chain plan, the reduced time buckets supply chain problem may comprise a reduced number of time buckets. First solver engine 216 may access and use one or more reduced time buckets supply chain problems to identify one or more response and non-responsive buffers, as described in greater detail below.

Response buffers data 236 may comprise data related to one or more response buffers identified by first solver engine 216. First solver engine 216 may solve the reduced time bucket supply chain problem in order to identify actual response buffers that contribute to the outcome of solving the reduced time bucket supply chain problem, and non-responsive buffers that do not significantly influence the outcome of solving the reduced time bucket supply chain problem. Having identified response buffers, first solver engine 216 stores the response buffers in response buffers data 236.

Reduced scope supply chain problems data 238 may comprise one or more reduced scope supply chain problems. In an embodiment, and as compared to the scope of the initial supply chain plan, the reduced scope supply chain problem may comprise a supply chain problem with the same number of time buckets and aligned capacities, but with reduced scope and non-responsive buffers removed. Second solver engine 220 may access and use one or more reduced scope supply chain problems to generate one or more reduced scope supply chain plans.

Reduced scope supply chain plan data 240 comprises one or more reduced scope supply chain plans generated by second solver engine 220. In an embodiment, and as compared to the initial supply chain plan, the reduced scope supply chain plan may offer comparable accuracy and plan quality, while requiring significantly fewer computational resources and time periods to generate.

Figure 3:
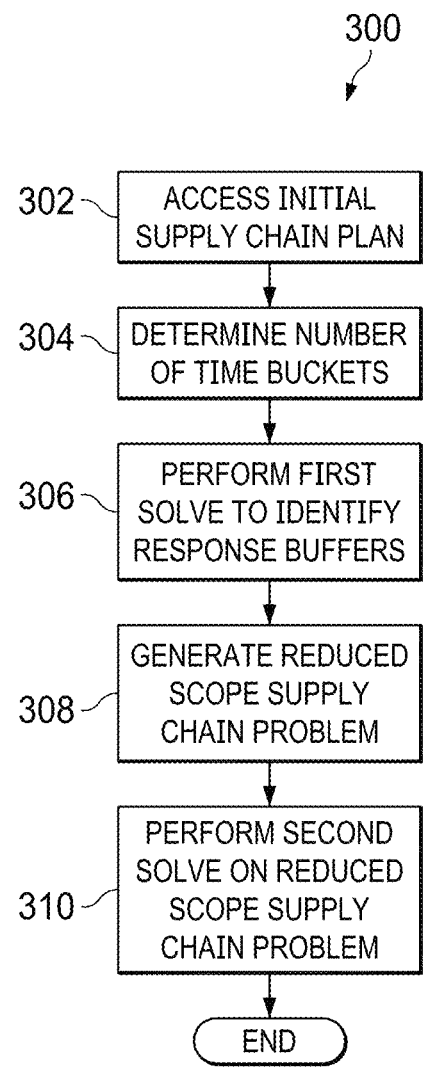
FIG. 3 illustrates an exemplary supply chain planning method, according to an embodiment.

FIG. 3 illustrates supply chain planning method 300 in which supply chain planner 110 generates and solves one or more reduced scope supply chain problems, according to an embodiment. The following supply chain planning method 300 proceeds by one or more actions 302-310, which although described in a particular order may be performed in one or more permutations, combinations, orders, or repetitions, according to particular needs.

At action 302 of supply chain planning method 300, the system and methodology accesses initial supply chain plan data 232. At action 304, the system and methodology evaluates the number of time-buckets for the initial supply chain plan to determine the quantity of time buckets that may be reduced in order to generate one or more reduced time bucket supply chain problems with no impairment on plan quality. According to embodiments, bucket evaluation engine 214 may use one or more time-bucket reduction methods, described in greater detail below, to determine the quantity of time buckets that may be reduced in order to generate one or more reduced time bucket supply chain problems. In an embodiment, the planning horizon remains the same and there will be no reduction to it in all the runs of first solver engine 216.

At action 306 of supply chain planning method 300, first solver engine 216 solves the reduced time bucket supply chain problem in order to identify response buffers that contribute to the outcome of solving the reduced time bucket supply chain problem, and non-responsive buffers that do not significantly influence the outcome of solving the reduced time bucket supply chain problem. At action 308, reduced scope supply chain problem generator 218 generates a reduced scope supply chain problem incorporating the original number of time buckets present in the initial supply chain plan and the response buffers identified by first solver engine 216, and excluding the non-responsive buffers. At action 310, second solver engine 220 solves the reduced scope supply chain problem and generates a reduced scope supply chain plan.

To illustrate the operation of supply chain planner 110 executing actions 302-310 of supply chain planning method 300 to generate and solve one or more reduced scope supply chain problems, an example is now given. In the following example, supply chain planner 110 generates and solves a reduced scope supply chain problem in the context of a meat processing BOM context, in which every cut of meat may yield multiple co-products and the number of BOM parts explodes at every stage of the supply chain. Although a particular example of generating and solving a reduced scope supply chain problem is provided herein, embodiments contemplate supply chain planner 110 implementing actions 302-310 of method 300 in other combinations and with respect to any number of buffers and any data, products, or industries in which highly complex and granular supply chain problems are found, according to particular needs.

Figure 4A:
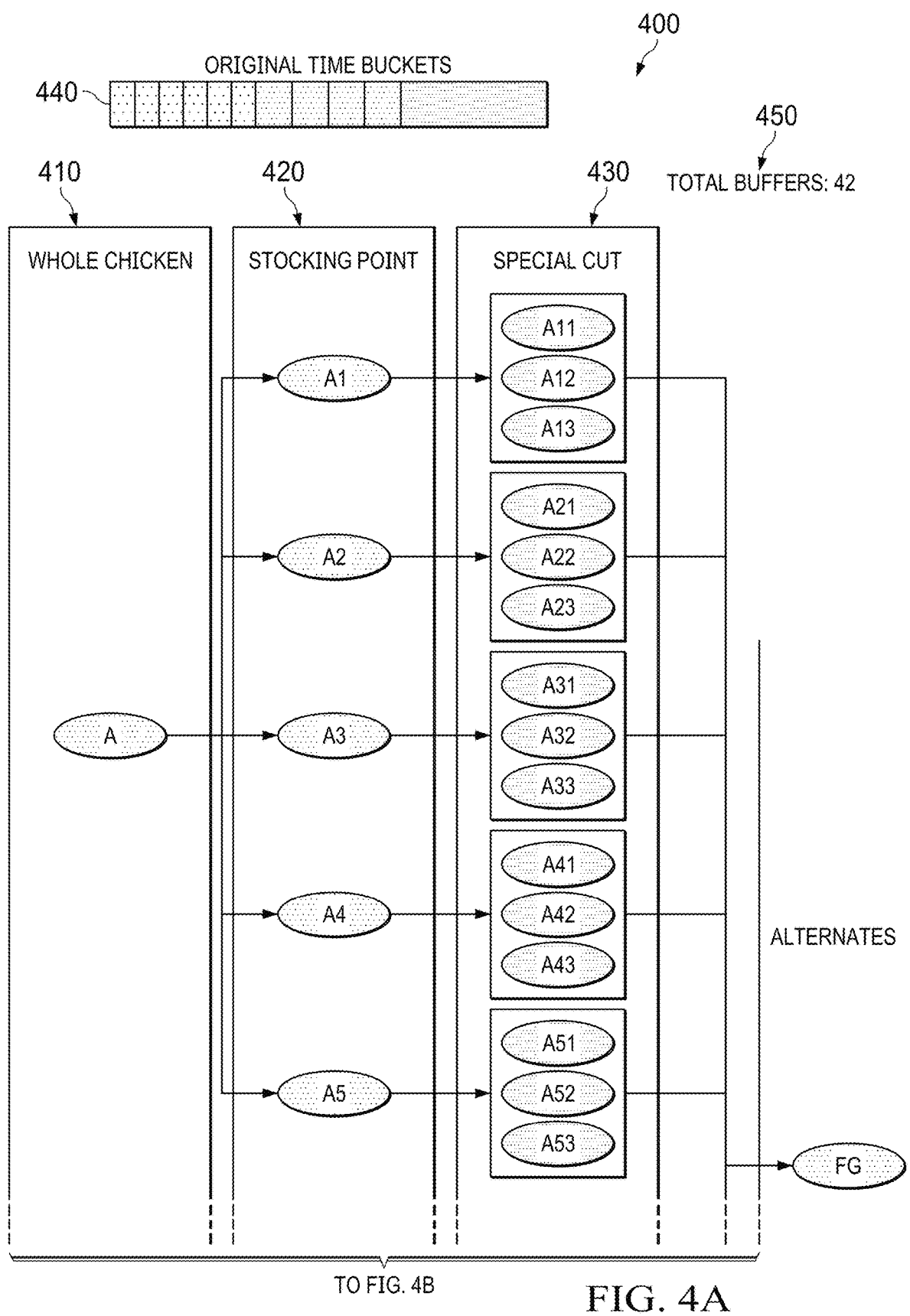
FIGS. 4A-4B illustrate an initial supply chain plan display, according to an embodiment.
Figure 4B:
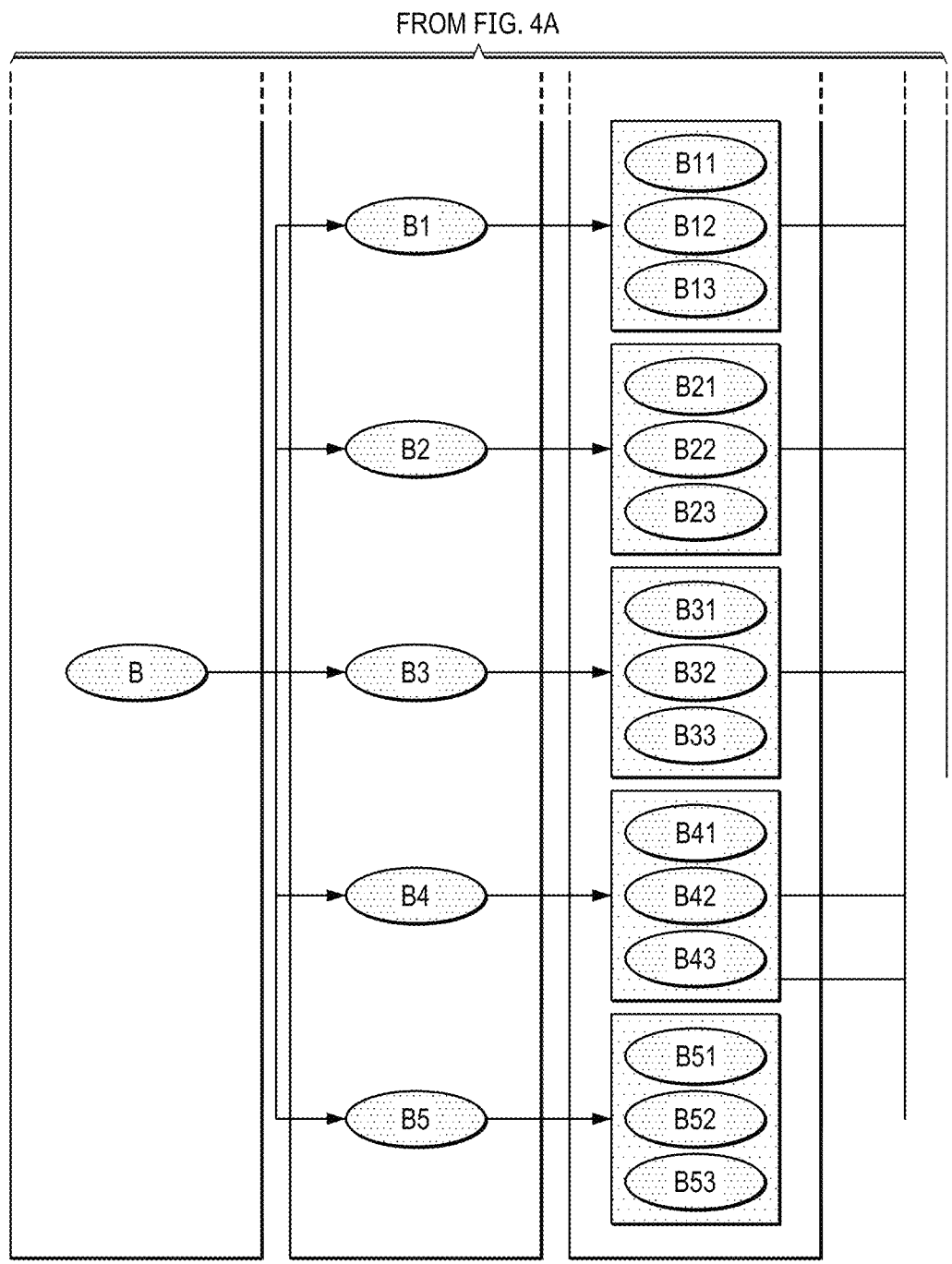

In the example, at action 302 of supply chain planning method 300, bucket evaluation engine 214 accesses initial supply chain plan data 232 and historical supply chain data 230. In this example, initial supply chain plan data 232 specifies supply chain actions for supply chain entities 150 participating in a poultry meat processing supply chain with forty-two buffers. Visualization engine 212 accesses initial supply chain plan data 232 and historical supply chain data 230 and generates initial supply chain plan display 400 (FIGS. 4A-4B). Visualization engine 212 may transmit initial supply chain plan display 400 to one or more computers 160 at one or more locations throughout supply chain network 100. One or more computers 160 may display initial supply chain plan display 400 using one or more display devices associated with the one or more computers 160, such as, for example, computer monitors.

FIGS. 4A-4B illustrate initial supply chain plan display 400, according to an embodiment. Initial supply chain plan display 400 may comprise a graphical display of one or more buffers 410-430 present in the initial supply chain plan, original time buckets display 440, and list of the total number of buffers 450 that comprise the initial supply chain plan. Although initial supply chain plan display 400 is illustrated and described as comprising a graphical display of one or more buffers 410-430 present in the initial supply chain plan, original time buckets display 440, and list of the total number of buffers 450 that comprise the initial supply chain plan, embodiments contemplate visualization engine 212 generating initial supply chain plan displays 400 in other configurations displaying other data stored in historical supply chain data 230 and/or initial supply chain plan data 232, according to particular needs.

According to embodiments, graphical display of one or more buffers 410-430 provides a visual representation of initial supply chain plan buffers 410-430. In the example illustrated by FIGS. 4A-4B, buffers 410-430 comprise whole chicken buffers 410 (A and B), stocking point buffers 420 (A1-A5 and B1-B5), and special cut buffers 430 (A11-13, A21-23, A31-33, A41-43, A51-53, B11-13, B21-23, B31-33, B41-43, and B51-53). The initial supply chain plan must account for each of these buffers 410-430, and may also account for attributes specified by each buffer 410-430, including but not limited to poultry standard, poultry grade, and poultry size. For a given planning cycle, all potential buffer combinations need to be presented to the initial supply chain problem solution space, from which the initial supply chain plan is generated. However, not all buffers may significantly affect the solving of the initial supply chain problem and the generation of the initial supply chain plan, and non-responsive buffers may be excluded from the granular supply chain problem solving process without significantly impacting subsequent plan quality.

Original time buckets display 440 comprises all time buckets relevant to the initial supply chain plan. In the example illustrated by FIGS. 4A-4B, the original time buckets comprise all seven days of the week, four weeks in a month, and a single month, resulting in 12 total time buckets of 3 different sizes (day, week, and month).

List of the total number of buffers 450 may list the total number of buffers presented by the initial supply chain plan. In the example illustrated by FIGS. 4A-4B, the initial supply chain plan comprises a total of 42 buffers. In other embodiments not illustrated by FIGS. 4A-4B, the initial supply chain plan may comprise any number of total buffers, including but not limited to several tens of thousands of buffers.

At action 304 of supply chain planning method 300, and continuing the example, bucket evaluation engine 214 evaluates the initial supply chain plan and determines the quantity of time buckets that may be reduced in order to generate one or more reduced time bucket supply chain problems without significantly impairing the quality and accuracy of the initial supply chain plan. At this action, bucket evaluation engine 214 determines the number of time buckets that may be removed from the initial supply chain plan without significantly adversely affecting plan quality. In this example, bucket evaluation engine 214 may utilize a time bucket reduction method, illustrated by FIG. 5 below, to determine the quantity of time buckets that may be reduced in order to generate reduced time bucket supply chain problem. In other embodiments, bucket evaluation engine 214 may use any method to determine the quantity of time buckets that may be reduced, according to particular needs.

Figure 5:
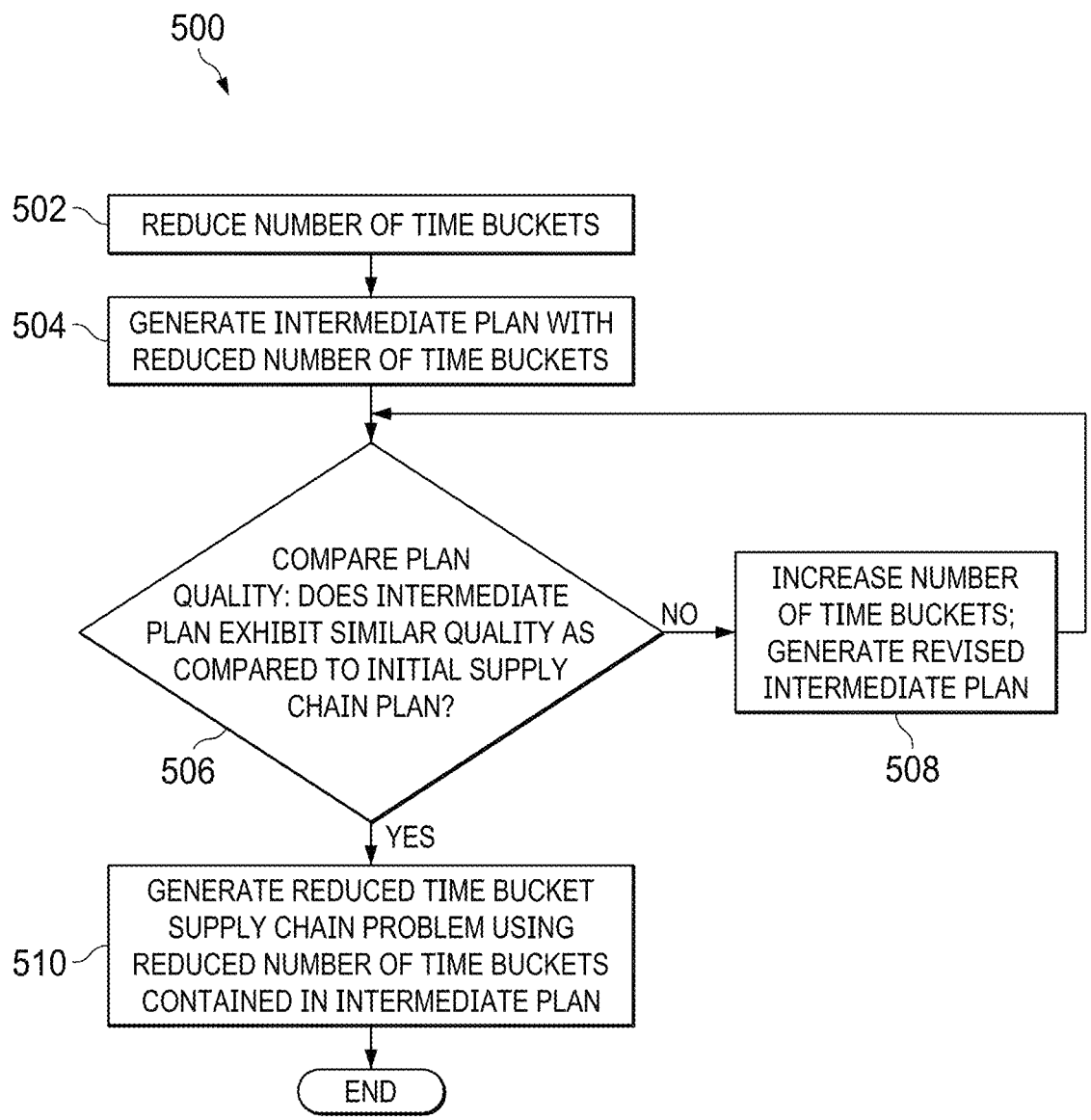
FIG. 5 illustrates a time bucket reduction method, according to an embodiment.

FIG. 5 illustrates time bucket reduction method 500 in which bucket evaluation engine 214, at action 304 of supply chain planning method 300, evaluates the initial supply chain plan and determines the quantity of time buckets that may be reduced in order to generate one or more reduced time bucket supply chain problems without significantly impacting accuracy and quality, according to an embodiment. The following time bucket reduction method 500 proceeds by one or more actions 502-510, which although described in a particular order may be performed in one or more permutations, combinations, orders, or repetitions, according to particular needs.

At action 502 of time bucket reduction method 500, bucket evaluation engine 214 reduces the number of time buckets present in the initial supply chain plan. According to embodiments, bucket evaluation engine 214 may utilize any method to select the number of time buckets to reduce in the initial supply chain plan, including but not limited to dividing the number of time buckets by half, by 4, by 8, or by any other number or metric. Continuing the example, bucket evaluation engine 214 reduces the original 12 total time buckets of 3 different sizes (day, week, and month) down to 3 total time buckets of equal size.

At action 504 of time bucket reduction method 500, bucket evaluation engine 214 generates an intermediate supply chain plan incorporating the selected number of reduced time buckets. Continuing the example, bucket evaluation engine 214 generates an intermediate supply chain plan and calculates outputs for the intermediate supply chain plan using 3 total time buckets of equal size.

At action 506 of the time bucket reduction method 500, bucket evaluation engine 214 compares the initial supply chain plan to the intermediate supply chain plan to evaluate the quality of the intermediate supply chain plan as compared to the initial supply chain plan. At this action, bucket evaluation engine 214 determines whether the reduced number of time buckets present in the intermediate supply chain plan has resulted in a loss of plan quality and accuracy as compared to the initial supply chain plan and its original quantity of time buckets. Bucket evaluation engine 214 may use any method or metric to compare the accuracy and quality of the initial supply chain plan to the intermediate supply chain plan, including but not limited to fill rate accuracy, resource utilization accuracy, and inventory profiles, according to particular needs. If bucket evaluation engine 214 determines that only an insignificant amount of quality and accuracy has been lost, and that the intermediate plan exhibits similar quality as compared to the initial supply chain plan, the bucket evaluation module proceeds to action 510 of time bucket reduction method 500 and generates a reduced time bucket supply chain problem, described in greater detail below. If, however, bucket evaluation engine 214 determines that a significant amount of quality and accuracy has been lost in the intermediate supply chain plan, bucket evaluation engine 214 proceeds to action 508 of time bucket reduction method 500 and increases the number of time buckets, as described in greater detail below.

Continuing the example, at action 506 of time bucket reduction method 500, bucket evaluation engine 214 determines that reducing the original twelve total time buckets of three different sizes (day, week, and month) in the initial supply chain plan to three total time buckets of equal size in the intermediate supply chain plan has resulted in a significant loss of quality and accuracy in the intermediate supply chain plan. Bucket evaluation engine 214 proceeds to action 508 of time bucket reduction method 500.

At action 508 of time bucket reduction method 500, bucket evaluation engine 214 increases the number of time buckets present in the intermediate supply chain plan, and generates a revised intermediate supply chain plan incorporating the increased number of time buckets. Bucket evaluation engine 214 may increase the number of time buckets using any metric, according to particular needs. Continuing the example, bucket evaluation engine 214 increases the number of time buckets from three total time buckets of equal size to five total time buckets of equal size, and generates a revised intermediate supply chain plan comprising five total time buckets of equal size. Bucket evaluation engine 214 returns to action 506 of time bucket reduction method 500, and compares the initial supply chain plan to the revised intermediate supply chain plan to evaluate the quality of the revised intermediate supply chain plan as compared to the initial supply chain plan. In this example, the revised intermediate supply chain plan comprising 5 total time buckets does not result in an appreciable loss of plan quality and accuracy as compared to the initial supply chain plan. The bucket evaluation module proceeds to action 510 of time bucket reduction method 500.

At action 510 of time bucket reduction method 500, bucket evaluation engine 214 generates a reduced time bucket supply chain problem comprising the number of time buckets present in the intermediate supply chain plan. Bucket evaluation engine 214 stores the reduced time bucket supply chain problem in reduced time bucket supply chain problems data 234, and terminates time bucket reduction method 500. Continuing the example, bucket evaluation engine 214 generates a reduced time bucket supply chain problem comprising five total time buckets of equal size. Bucket evaluation engine 214 stores the reduced time bucket supply chain problem in reduced time bucket supply chain problems data 234, and exits time bucket reduction method 500.

At action 306 of supply chain planning method 300, and continuing the example, first solver engine 216 accesses the reduced time bucket supply chain problem comprising five total time buckets of equal size. First solver engine 216 solves the reduced time bucket supply chain problem comprising the five total time buckets in order to identify response buffers that contribute to the outcome of solving the reduced time bucket supply chain problem, and non-responsive buffers that do not significantly influence the outcome of solving the reduced time bucket supply chain problem. In this example, first solver engine 216 identifies nine buffers, comprising B31-33, B41-43, and B51-53, that are non-responsive and do not significantly influence the outcome of solving the reduced time bucket supply chain problem. First solver engine 216 stores the responsive buffers (in this example, whole chicken buffers A and B, stocking point buffers A1-A5 and B1-B5, and special cut buffers A11-13, A21-23, A31-333, A41-43, A51-53, B11-13, and B21-23) in response buffers data 236. Visualization engine 212 accesses reduced time bucket supply chain problems data 234 and response buffers data 236, and generates a reduced time buckets display. Visualization engine 212 may transmit the reduced time buckets display to one or more computers at one or more locations throughout supply chain network 100. One or more computers may display the reduced time buckets display using one or more display devices associated with the one or more computers, such as, for example, computer monitors.

Figure 6A:
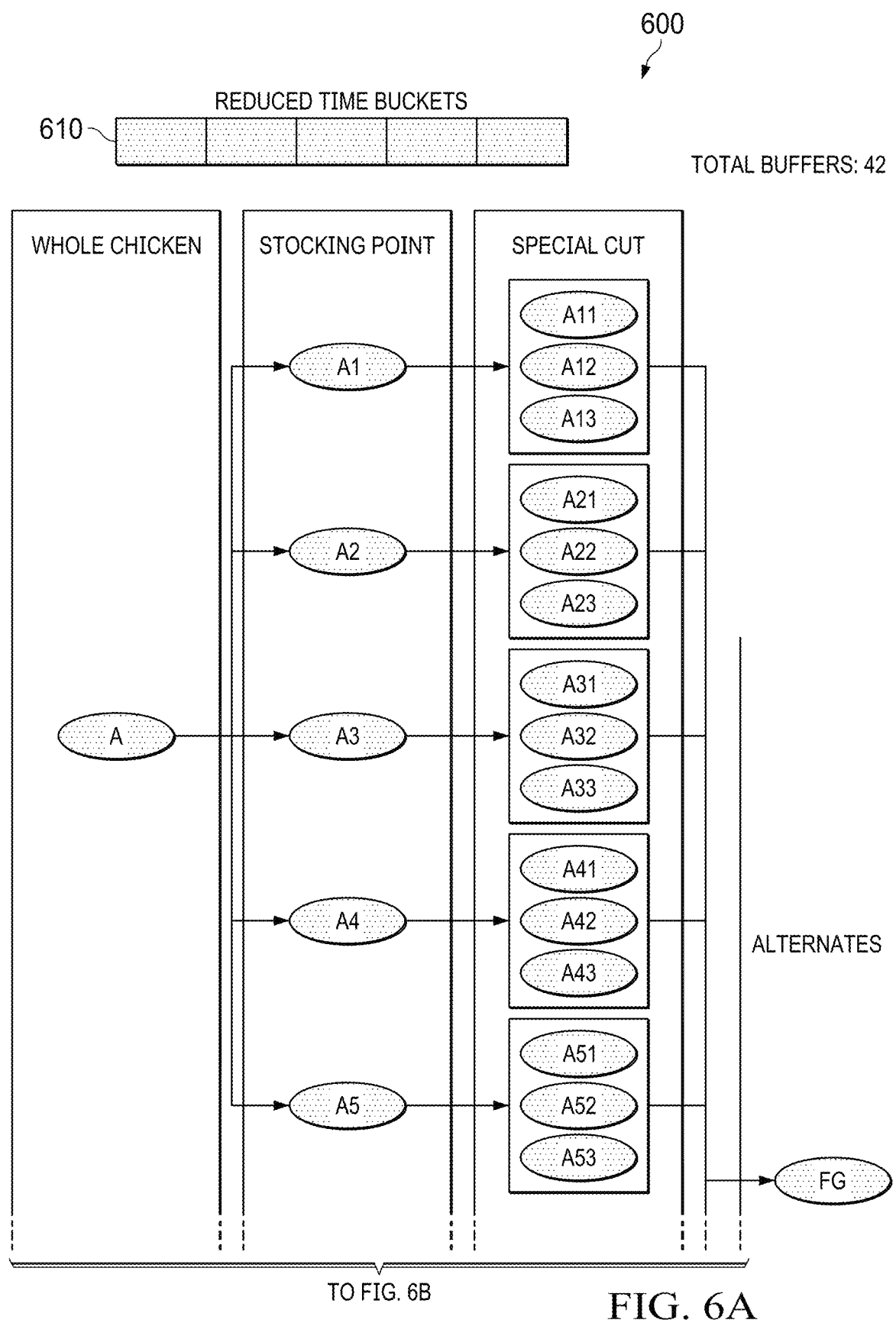
FIGS. 6A-6B illustrate a reduced time buckets display, according to an embodiment.
Figure 6B:
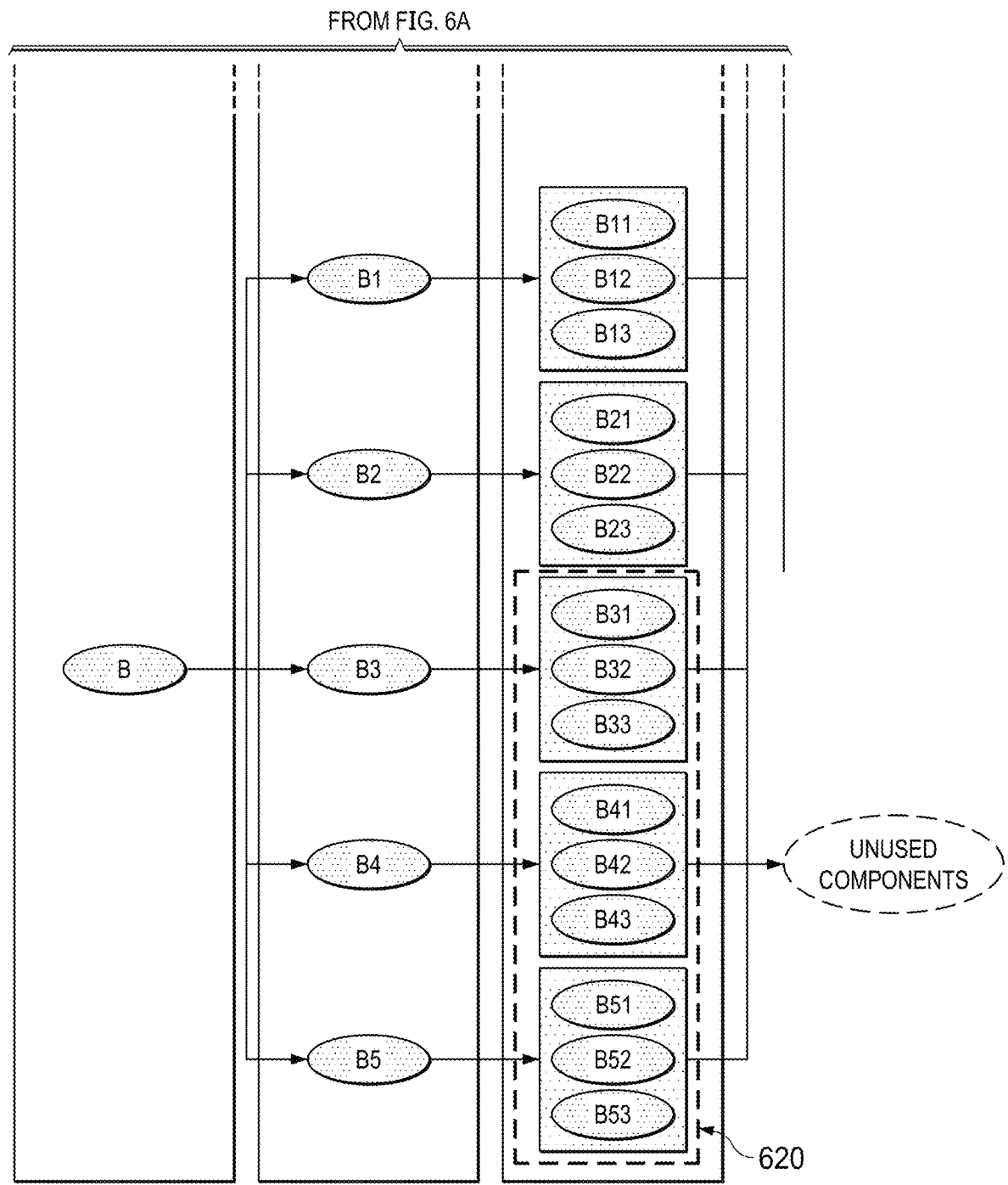

FIGS. 6A-6B illustrate reduced time buckets display 600, according to an embodiment. Reduced time buckets display 600 may comprise, among other components, a graphical display of one or more reduced time buckets 610 and one or more non-responsive buffers 620. Although reduced time buckets display 600 is illustrated and described as comprising graphical display of one or more reduced time buckets 610 and one or more non-responsive buffers 620, embodiments contemplate visualization engine 212 generating reduced time buckets displays in other configurations, according to particular needs.

Continuing the example, graphical display of reduced time buckets display 600 displays the five total time buckets of equal size that comprise the reduced time bucket supply chain problem. One or more non-responsive buffers 620 display the nine buffers, comprising B31-33, B41-43, and B51-53, that are non-responsive and do not significantly influence the outcome of solving the reduced time bucket supply chain problem.

At action 308 of supply chain planning method 300, and continuing the example, reduced scope supply chain problem generator 218 accesses initial supply chain plan data 232, reduced time bucket supply chain problems data 234, and response buffers data 236. Reduced scope supply chain problem generator 218 generates a reduced scope supply chain problem, excluding non-responsive buffers B31-33, B41-43, and B51-53 and incorporating the original number of time buckets present in the initial supply chain plan (in this example, twelve total time buckets of three different sizes (day, week, and month)), response buffers A and B, stocking point buffers A1-A5 and B1-B5, and special cut buffers A11-13, A21-23, A31-333, A41-43, A51-53, B11-13, and B21-23. Reduced scope supply chain problem generator 218 stores the reduced scope supply chain problem in reduced scope supply chain problems data 238.

Figure 7A:
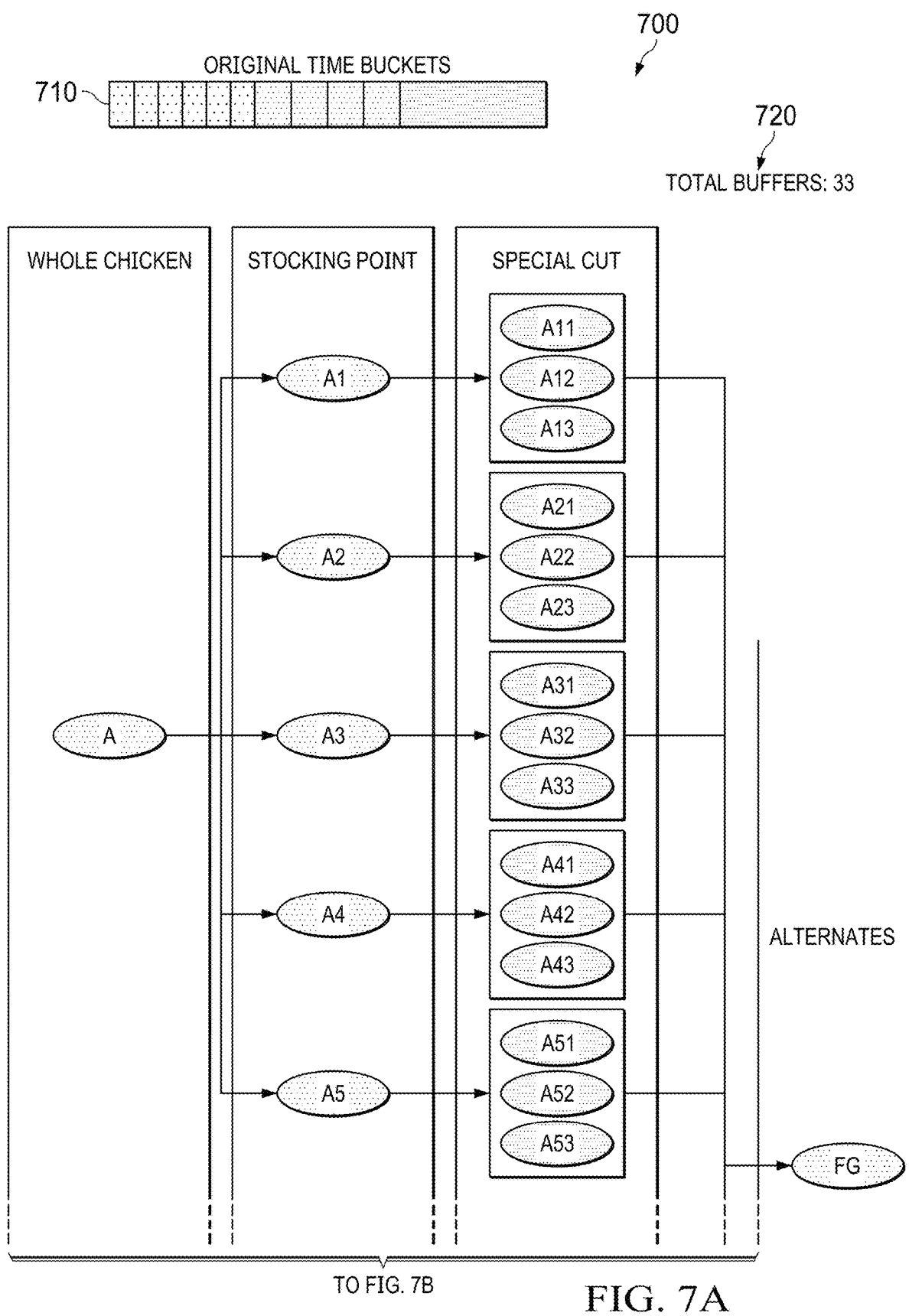
FIGS. 7A-7B illustrate a reduced scope supply chain plan display, according to an embodiment.
Figure 7B:
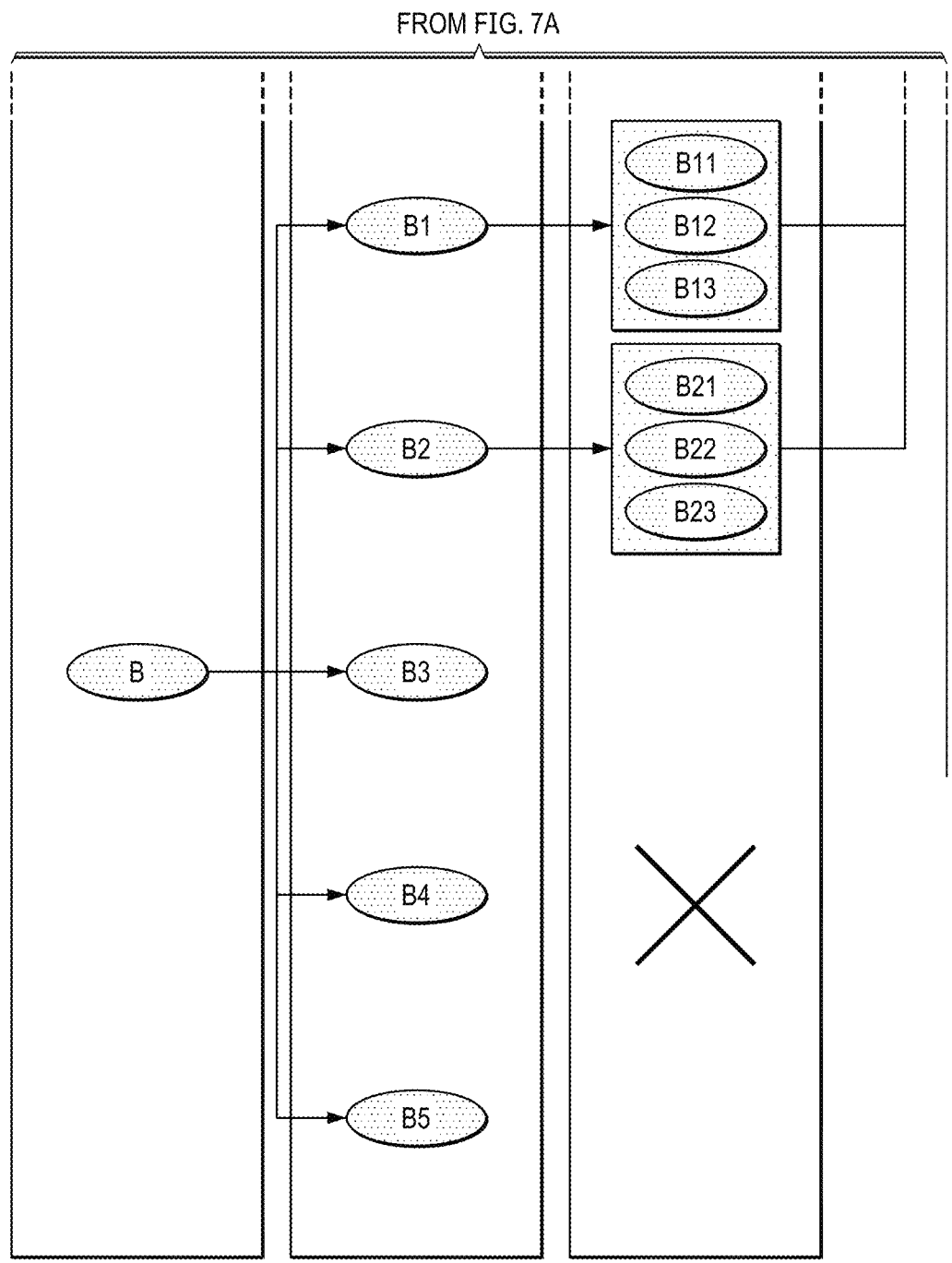

At action 310 of supply chain planning method 300, and continuing the example, second solver engine 220 accesses reduced scope supply chain problems data 238. Second solver engine 220 solves the reduced scope supply chain problem to generate a reduced scope supply chain plan. Second solver engine 220 stores the reduced scope supply chain plan in reduced scope supply chain plan data 240. Visualization engine 212 accesses reduced scope supply chain plan data 240, and generates reduced scope supply chain plan display 700 (FIGS. 7A-7B). Visualization engine 212 may transmit reduced scope supply chain plan display 700 to one or more computers 160 at one or more locations throughout supply chain network 100. One or more computers 160 may display reduced scope supply chain plan display 700 using one or more display devices associated with the one or more computers 160, such as, for example, computer monitors.

FIGS. 7A-7B illustrate reduced scope supply chain plan display 700, according to an embodiment. Reduced scope supply chain plan display 700 may comprise, among other components, original time buckets display 710 and list of the total number of buffers 720. Although reduced scope supply chain plan display 700 is illustrated and described as comprising original time buckets display 710 and list of the total number of buffers 720, embodiments contemplate visualization engine 212 generating reduced scope supply chain plan displays 700 in other configurations, according to particular needs.

Original time buckets display 710 comprises all time buckets relevant to the reduced scope supply chain plan. In the example illustrated by FIGS. 7A-7B, the original time buckets comprise all seven days of the week, four weeks in a month, and a single month, resulting in twelve total time buckets of three different sizes (day, week, and month), matching the original time buckets of the initial supply chain plan.

List of the total number of buffers 720 may list the total number of buffers included in the reduced scope supply chain plan. In the example illustrated by FIGS. 7A-7B, the reduced scope supply chain plan comprises a total of thirty-three buffers, excluding the nine non-responsive buffers. Because the reduced scope supply chain plan comprises only thirty-three buffers, as compared to the forty-two buffers of the initial supply chain plan, second solver engine 220 may generate the reduced scope supply chain plan more quickly and with fewer required computational resources than those demanded by the initial supply chain plan, without significantly reducing the accuracy and quality of the initial supply chain plan. Second solver engine 220 may proceed to terminate supply chain planning method 300.

Embodiments contemplate supply chain planner 110 executing the actions described above to reduce supply chain buffers by up to 70%, without significantly impacting the quality of the supply chain plan. In an embodiment, supply chain planner 110 utilizes the actions described above to reduce fifty-three thousand buffers present in an initial supply chain plan to twelve thousand buffers in a reduced scope supply chain plan, without significantly impacting the accuracy and quality of the initial supply chain plan.

Figure 8:
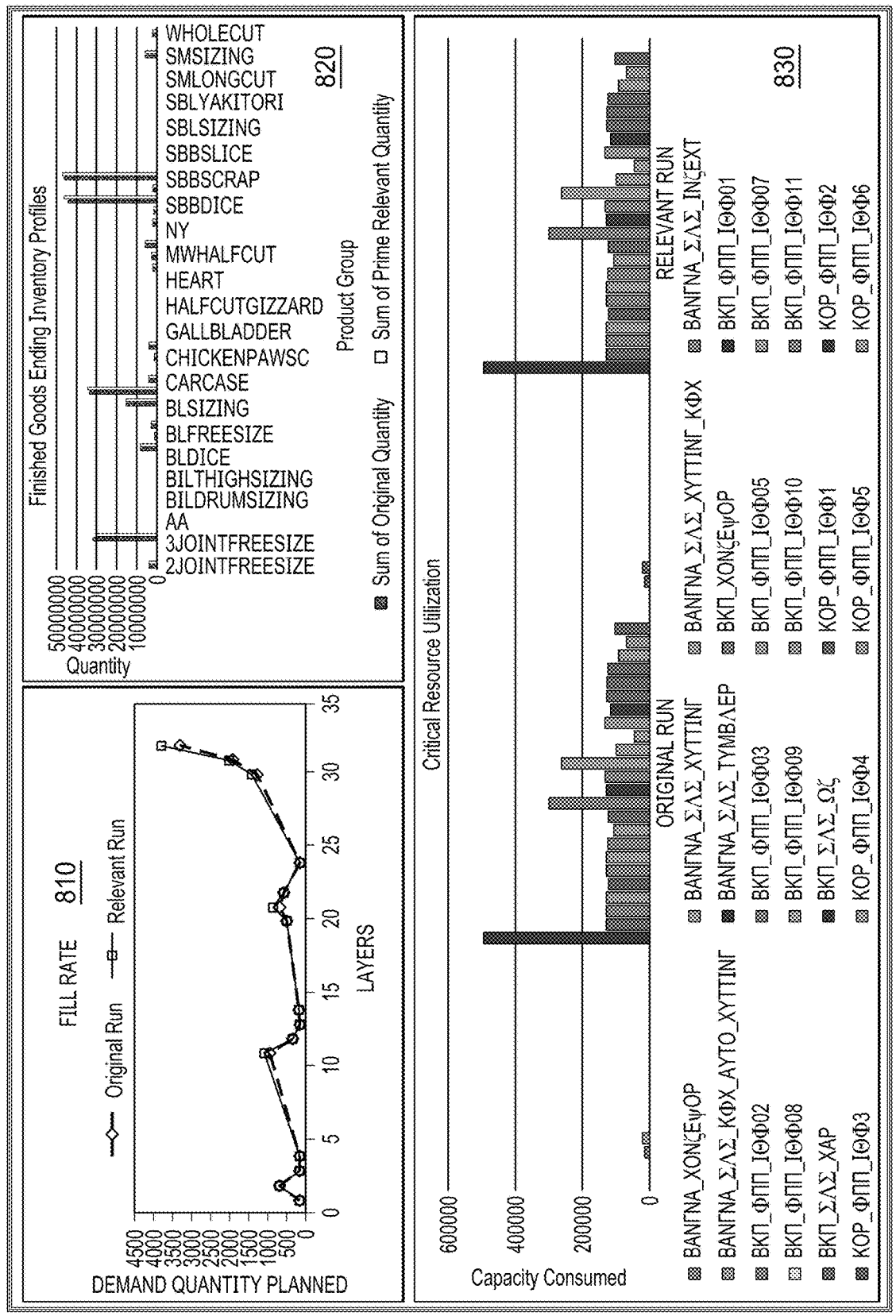
FIG. 8 illustrates a comparison display, according to an embodiment.

FIG. 8 illustrates comparison display 800 generated by visualization engine 212, according to an embodiment. Comparison display 800 may comprise fill rate display 810, finished goods ending inventory profiles display 820, and critical resource utilization display 830. Although comparison display 800 is illustrated as comprising fill rate display 810, finished goods ending inventory profiles display 820, and critical resource utilization display 830, embodiments contemplate visualization engine 212 generating comparison displays 800 in other configurations, according to particular needs.

According to embodiments, comparison display 800 may display planned demand, finished goods, critical resource utilization, or other variables related to the initial supply chain plan, one or more reduced time bucket supply chain problems, one or more reduced scope supply chain problems, and/or one or more reduced scope supply chain plans. Comparison display 800 may facilitate comparison between the initial supply chain plan and one or more reduced time bucket supply chain problems, one or more reduced scope supply chain problems, and/or one or more reduced scope supply chain plans using any comparison metrics, according to particular needs.

Figure 9:
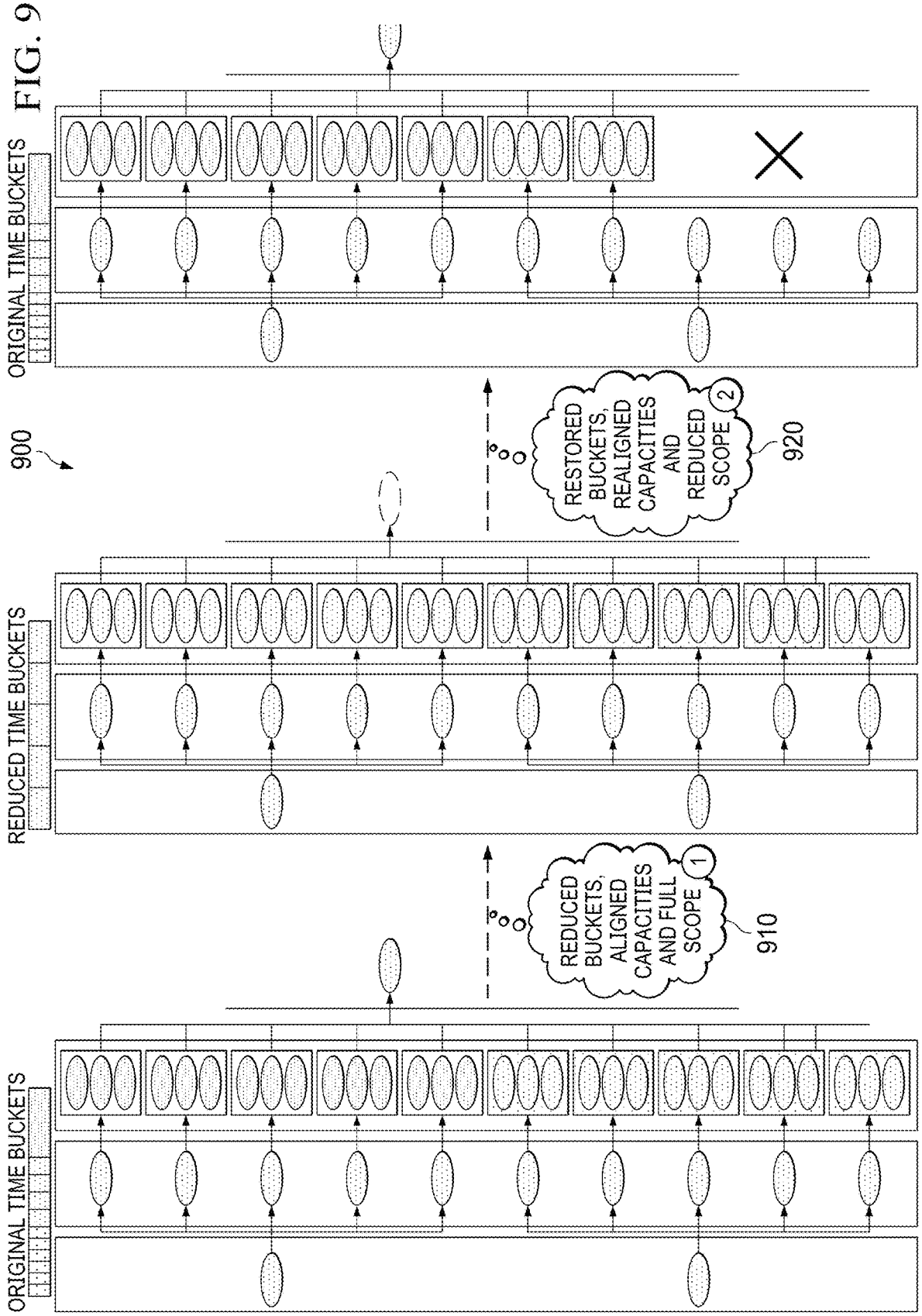
FIG. 9 illustrates a process by which a supply chain planner may execute the actions of the method of FIG. 3, according to an embodiment.

FIG. 9 illustrates overview of a process 900 by which supply chain planner 110 may execute the actions of the above-described methods 300 and 500, according to an embodiment. In an embodiment, supply chain planner 110 may perform an empirical analysis to determine the number of uniform buckets required, covering the entire planning horizon, so that the plan output yields the same response buffers as with the original buckets. Response buffers are those buffers upon which at least one activity of supply or consumption has taken place in the entire supply chain plan. In an embodiment, once supply chain planner 110 determines the number of buckets for a planning instance, supply chain planner 110 performs the following cycles in all the subsequent runs of the instance:

(1) at activity 910, identify the response buffers by using the reduced buckets covering the same horizon;
(2) at activity 920, deactivate or delete the non-responsive buffers; and
(3) run the plan after restoring the original buckets and with only the response buffers.

Figure 10:
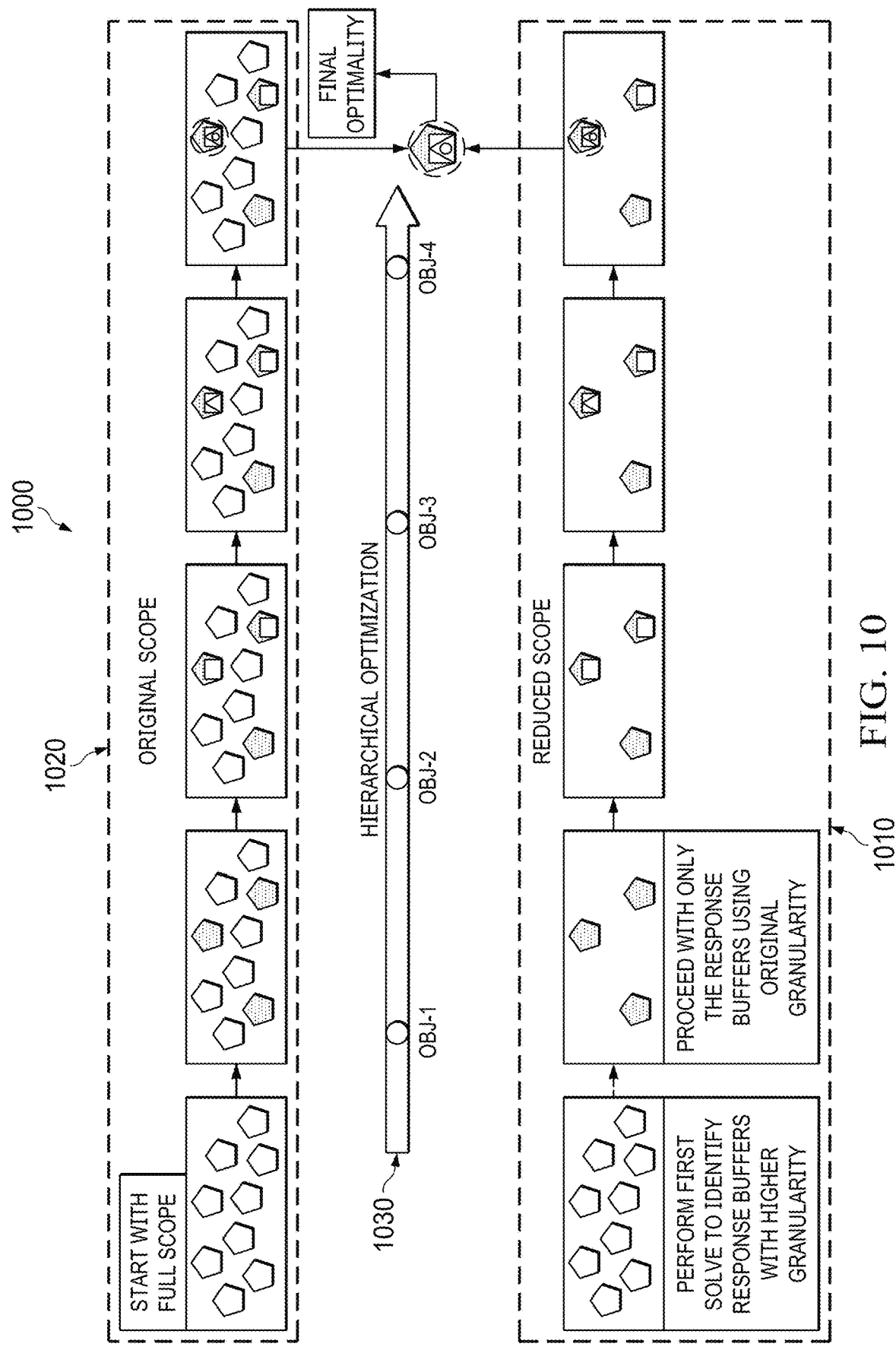
FIG. 10 illustrates an optimality analysis, according to an embodiment.

FIG. 10 illustrates optimality analysis 1000, according to an embodiment. In this embodiment, in which supply chain planner 110 executes the actions of process 900, combined runtime of the above-described actions 1010 (specifically, (1) identifying the response buffers by using the reduced buckets covering the same horizon; (2) deactivating or deleting the non-responsive buffers; and (3) running the plan after restoring the original buckets and with only the response buffers) is found to be significantly lower than original run 1020 with actual buckets and with full scope of buffers. In this embodiment, there is also no significant deterioration of plan quality measure for key KPIs. The reason for plan quality remaining intact may be attributed to the nature of hierarchical optimization 1030, wherein the solution space is reduced for each passing objective. Embodiments of the system and method described herein begin with the reduced solution space, thereby saving computational resources. The system and method described herein may be particularly useful in supply chains where co-products and bi-products are created at almost every step and the final demand is subjected to such huge choices of alternates, including but not limited to the meat processing industry.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

The invention claimed is:

1. A system, comprising:
a supply chain system comprising one or more supply chain entities; and
a computer comprising a processor and memory, the computer configured to:
  access an initial supply chain plan of the one or more supply chain entities;
  perform an empirical analysis to determine a quantity of uniform time buckets required to cover the entire planning horizon of the initial supply chain plan;
  determine a quantity of time buckets to remove from the quantity of uniform time buckets while maintaining the same planning horizon, aggregate bucketized capacities, and response buffers as the initial supply chain plan;
  remove the determined quantity of time buckets from the quantity of uniform time buckets;
  identify, using the reduced time buckets, initial supply chain plan response buffers and non-responsive buffers;
  generate a reduced scope supply chain problem by deactivating one or more non-responsive buffers; and
  control manufacturing equipment to produce products based, at least in part, on a solution to the reduced scope supply chain problem.

2. The system of claim 1, wherein the computer is further configured to determine the quantity of time buckets to remove by:
generating an intermediate supply chain plan with a reduced number of time buckets for the same planning horizon and aggregate bucketized capacities; and
comparing the quality of the initial supply chain plan with the intermediate supply chain plan.

3. The system of claim 1, wherein the computer is configured to perform an empirical analysis to determine the quantity of uniform time buckets required to cover the entire planning horizon of the initial supply chain plan without a deterioration to plan quality.

4. The system of claim 1, wherein the reduced scope supply chain plan comprises the restored original number and granularity of time buckets, aggregate bucketized capacities, and the identified response buffers without a deterioration to plan quality.

5. The system of claim 1, wherein the computer is configured to generate the reduced scope supply chain plan with a lower runtime than an original run with a full scope of buffers.

6. The system of claim 1, wherein the response buffers are a set of buffers which receive at least one supply or consumption activity in the supply chain plan.

7. The system of claim 1, wherein at least one of the one or more supply chain entities is a meat processing entity.

8. A method, comprising:
   accessing, by a computer comprising a processor and memory, an initial supply chain plan of one or more supply chain entities;
   performing, by the computer, an empirical analysis to determine a quantity of uniform time buckets required to cover the entire planning horizon of the initial supply chain plan;
   determining, by the computer, a quantity of time buckets to remove from the quantity of uniform time buckets while maintaining the same planning horizon, aggregate bucketized capacities, and response buffers as the initial supply chain plan;
   removing, by the computer, the determined quantity of time buckets from the quantity of uniform time buckets;
   identifying, by the computer, using the reduced time buckets, initial supply chain plan response buffers and non-responsive buffers;
   generating, by the computer, a reduced scope supply chain problem by deactivating one or more non-responsive buffers; and
   controlling, by the computer, manufacturing equipment to produce products based, at least in part, on a solution to the reduced scope supply chain problem.

9. The method of claim 8, wherein determining the quantity of time buckets to remove comprises:
   generating, by the computer, an intermediate supply chain plan with a reduced number of time buckets for the same planning horizon and aggregate bucketized capacities; and
   comparing, by the computer, the quality of the initial supply chain plan with the intermediate supply chain plan.

10. The method of claim 8, wherein performing an empirical analysis to determine the quantity of uniform time buckets required to cover the entire planning horizon of the initial supply chain plan comprises a quantity without a deterioration to plan quality.

11. The method of claim 8, wherein the reduced scope supply chain plan comprises the restored original number and granularity of time buckets, aggregate bucketized capacities, and the identified response buffers without a deterioration to plan quality.

12. The method of claim 8, wherein the reduced scope supply chain plan comprises a lower runtime than an original run with a full scope of buffers.

13. The method of claim 8, wherein the response buffers are a set of buffers which receive at least one supply or consumption activity in the supply chain plan.

14. The method of claim 8, wherein at least one of the one or more supply chain entities is a meat processing entity.

15. A non-transitory computer-readable medium embodied with software, the software when executed:
   accesses an initial supply chain plan of one or more supply chain entities;
   performs an empirical analysis to determine a quantity of uniform time buckets required to cover the entire planning horizon of the initial supply chain plan;
   determines a quantity of time buckets to remove from the quantity of uniform time buckets while maintaining the same planning horizon, aggregate bucketized capacities, and response buffers as the initial supply chain plan;
   removes the determined quantity of time buckets from the quantity of uniform time buckets;
   identifies using the reduced time buckets, initial supply chain plan response buffers and non-responsive buffers;
   generates a reduced scope supply chain problem by deactivating one or more non-responsive buffers; and
   controls manufacturing equipment to produce products based, at least in part, on a solution to the reduced scope supply chain problem.

16. The non-transitory computer-readable medium of claim 15, wherein the software when executed determines the quantity of time buckets to remove by:
   generating an intermediate supply chain plan with a reduced number of time buckets for the same planning horizon and aggregate bucketized capacities; and
   comparing the quality of the initial supply chain plan with the intermediate supply chain plan.

17. The non-transitory computer-readable medium of claim 15, wherein the software when executed performs an empirical analysis to determine the quantity of uniform time buckets required to cover the entire planning horizon of the initial supply chain plan without a deterioration to plan quality.

18. The non-transitory computer-readable medium of claim 15, wherein the reduced scope supply chain plan comprises the restored original number and granularity of time buckets, aggregate bucketized capacities, and the identified response buffers without a deterioration to plan quality.

19. The non-transitory computer-readable medium of claim 15, wherein the reduced scope supply chain plan comprises a lower runtime than an original run with a full scope of buffers.

20. The non-transitory computer-readable medium of claim 15, wherein the response buffers are a set of buffers which receive at least one supply or consumption activity in the supply chain plan.

* * * * *